US010712187B2

(12) United States Patent
Posselius et al.

(10) Patent No.: US 10,712,187 B2
(45) Date of Patent: Jul. 14, 2020

(54) SPRAY PATTERN MONITORING SYSTEM

(71) Applicant: CNH Industrial America LLC, New Holland, PA (US)

(72) Inventors: John Posselius, Ephrata, PA (US); Tim Stombaugh, Nicholasville, KY (US); Yongbo Wan, Dublin, OH (US)

(73) Assignee: CNH Industrial America LLC, New Holland, PA (US)

( * ) Notice: Subject to any disclaimer, the term of this patent is extended or adjusted under 35 U.S.C. 154(b) by 145 days.

(21) Appl. No.: 15/898,834

(22) Filed: Feb. 19, 2018

(65) Prior Publication Data
US 2019/0257678 A1    Aug. 22, 2019

(51) Int. Cl.
| G01F 1/66 | (2006.01) |
| A01C 23/04 | (2006.01) |
| A01C 23/00 | (2006.01) |
| B05B 12/08 | (2006.01) |
| B05B 1/20 | (2006.01) |
| B05B 12/00 | (2018.01) |
| G01N 21/53 | (2006.01) |
| A01M 7/00 | (2006.01) |

(52) U.S. Cl.
CPC ............ *G01F 1/662* (2013.01); *A01C 23/007* (2013.01); *A01C 23/047* (2013.01); *A01M 7/0089* (2013.01); *B05B 1/20* (2013.01); *B05B 12/008* (2013.01); *B05B 12/082* (2013.01); *G01F 1/661* (2013.01); *G01N 21/53* (2013.01)

(58) Field of Classification Search
CPC ....... B05B 1/20; B05B 12/008; B05B 12/082; G01F 1/661; G01F 1/662; G01N 21/53; A01C 23/007; A01C 23/047; A01M 7/0089
See application file for complete search history.

(56) References Cited

U.S. PATENT DOCUMENTS 3,164,012 A * 1/1965 Childs .................... F02M 65/00
                                                         73/114.46
4,165,635 A * 8/1979 Komaroff ............. B60F 3/0053
                                                         73/114.45
(Continued)

OTHER PUBLICATIONS

Velocimetry—Phase Doppler Particle Analyzers; http://velocimetry.net/pdpa_principles.htm—(2) pages.
(Continued)

*Primary Examiner* — Darren W Gorman
(74) *Attorney, Agent, or Firm* — Rebecca L. Henkel; Rickard K. DeMille

(57) ABSTRACT

With the use of electromagnetic radiation sources, such as lasers emitting light, and corresponding detectors, spray patterns from spray nozzle assemblies can be sampled and compared to one or more calibration patterns to determine if nozzles of spray nozzle assemblies are worn out. A unique calibration pattern could be used to compare for each spray nozzle assembly, and/or a single calibration pattern could be used to compare for multiple spray assemblies. In one aspect, detectors can be arranged near sources to detect electromagnetic radiation reflected by spray patterns. In another aspect, detectors can be arranged opposite of sources to detect electromagnetic radiation transmitted through a spray pattern.

20 Claims, 6 Drawing Sheets

(56) References Cited

U.S. PATENT DOCUMENTS

| | | | | |
|---|---|---|---|---|
| 4,193,356 A * | 3/1980 | Vehe | .................... | A01B 49/065 111/118 |
| 4,905,897 A * | 3/1990 | Rogers | ................ | A01M 7/0096 239/1 |
| 5,208,064 A * | 5/1993 | Becker | .................. | B05B 12/082 427/8 |
| 5,278,423 A | 1/1994 | Wangler et al. | | |
| 5,312,039 A * | 5/1994 | Sayka | .................. | B05B 12/082 118/688 |
| 5,334,987 A | 8/1994 | Teach | | |
| 6,457,655 B1 | 10/2002 | Reighard et al. | | |
| 7,040,546 B2 | 5/2006 | Horan et al. | | |
| 7,182,271 B2 | 2/2007 | Cesak | | |
| 7,188,781 B2 | 3/2007 | Reighard et al. | | |
| 7,311,004 B2 | 12/2007 | Giles | | |
| 7,738,694 B2 * | 6/2010 | Prociw | .................. | B05B 12/004 382/141 |
| 7,792,611 B2 * | 9/2010 | Scheer | .................. | B05B 12/082 239/11 |
| 8,134,703 B2 * | 3/2012 | Sivathanu | ........... | G01M 99/008 356/335 |
| 8,833,680 B2 | 9/2014 | Ellingson et al. | | |
| 8,944,343 B2 | 2/2015 | Cesak et al. | | |
| 9,532,563 B2 | 1/2017 | Arenson et al. | | |
| 9,766,105 B2 | 9/2017 | Ni | | |
| 2005/0011281 A1 | 1/2005 | Wulteputte | | |
| 2014/0048611 A1 | 2/2014 | Palmquist | | |
| 2015/0351375 A1 * | 12/2015 | Ni | ......................... | A01M 7/005 239/1 |
| 2016/0338335 A1 | 11/2016 | Hammer et al. | | |
| 2016/0368011 A1 | 12/2016 | Feldhaus et al. | | |
| 2017/0024870 A1 | 1/2017 | Reichardt | | |
| 2017/0080445 A1 | 3/2017 | Posselius et al. | | |
| 2017/0259289 A1 | 9/2017 | Schoen et al. | | |
| 2017/0274400 A1 | 9/2017 | Kowalchuk | | |

OTHER PUBLICATIONS

Malvern—Spray particle and spray droplet size measurement; https://www.malvern.com/en/products/product-range/spraytec—(2) pages.

SpraySpy—Analysis and monitoring for Sprays & Atomization; https://www.aom-systems.com/en/category-1/sprayspy/—(3) pages.

TeeJet—Nozzle Flow Monitor, Sentry 6140—https://www.dultmeier.com/products/0.88.4528.5746/11687—(2) pages.

* cited by examiner

SPRAY PATTERN MONITORING SYSTEM

FIELD OF THE INVENTION

The present invention relates generally to agricultural sprayers, and in particular, to spray systems for agricultural sprayers in which electromagnetic radiation sources and detectors are used to produce detection patterns corresponding to spray patterns of spray nozzle assemblies for comparing to calibration patterns to determine when such spray nozzle assemblies are worn out.

BACKGROUND OF THE INVENTION

Field sprayers, as known in the art, are typically attached to, or towed by, an agricultural implement such as a tractor or other vehicle, or are a dedicated self-propelled sprayer vehicle, Such sprayers generally include a fluid holding tank supported by a frame. The fluid holding tank typically stores a crop protection fluid, such as pesticides or liquid fertilizer, which often consists of a carrier fluid (such as water) mixed with a chemical at a predetermined concentration. The fluid holding tank, in turn, is fluidly coupled to a series of spray nozzles spaced apart from one another along booms extending outwardly from the frame. Accordingly, the crop protection fluid may be dispensed through the spray nozzles onto the farm field, preferably in an even distribution spray pattern, so that the fluid is applied consistently across the farm field.

In some situations, the outlet of spray nozzles (orifices) may become worn out, thereby causing an undesirable increase in fluid flow (or undesirable loss of pressure at the same fluid flow) and/or irregular spray patterns at the spray nozzle outlet. This may result in a wasteful distribution of excess fluid and/or an inefficient distribution of fluid on the agricultural field. Consequently, what is needed is an efficient way to accurately determine when a particular spray nozzle has worn out and therefore requires replacement.

SUMMARY OF THE INVENTION

With the use of electromagnetic radiation sources, such as lasers emitting light, and corresponding detectors, spray patterns from spray nozzle assemblies can be sampled and compared to one or more calibration patterns to determine if nozzles of spray nozzle assemblies are worn out. A unique calibration pattern could be used to compare for each spray nozzle assembly, and/or a single calibration pattern could be used to compare for multiple spray assemblies. In one aspect, detectors can be arranged near sources to detect electromagnetic radiation reflected by spray patterns. In another aspect, detectors can be arranged opposite of sources to detect electromagnetic radiation transmitted through a spray pattern.

In one aspect, the invention can provide a system for monitoring the spray pattern of nozzles using a low cost laser beam and receiver. An ideal spray pattern can be modelled and/or a new nozzle's spray pattern can be captured when first installed on a boom with the use of a laser beam and target receiver. Acceptable limits to changes in the spray pattern can be established and then in real time the nozzle spray pattern can be monitored with the system. When a nozzle goes out of limits, a flag can be thrown. Aspects of this invention can be applied to autonomous sprayers in which an on-board monitoring system is used.

Specifically then, one aspect of the present invention provides a spray system including: a boom supporting a spray nozzle assembly having an outlet for discharging fluid in a spray pattern onto an agricultural field; an electromagnetic radiation source positioned near the outlet, the source being configured to direct a beam of electromagnetic radiation through the spray pattern; an electromagnetic radiation detector positioned near the outlet, the detector being configured to detect electromagnetic radiation transmitted through the spray pattern or reflected by the spray pattern to produce a detection pattern; a data structure holding a calibration pattern providing a target for electromagnetic radiation transmitted through the spray pattern or reflected by the spray pattern; and a controller in communication with the detector and the data structure, the controller being configured to receive the detection pattern and compare the detection pattern to the calibration pattern to determine an error for the spray nozzle assembly.

Another aspect of the present invention provides a method for determining a worn spray nozzle assembly including: discharging fluid in a spray pattern onto an agricultural field from an outlet of a spray nozzle assembly supported by a boom; directing a beam of electromagnetic radiation from an electromagnetic radiation source positioned near the outlet through the spray pattern; detecting electromagnetic radiation transmitted through the spray pattern or reflected by the spray pattern at an electromagnetic radiation detector positioned near the outlet to produce a detection pattern; and comparing the detection pattern to a calibration pattern providing a target for electromagnetic radiation transmitted through the spray pattern or reflected by the spray pattern to determine an error for the spray nozzle assembly.

Another aspect of the present invention provides a self-propelled sprayer including: an operator cab supported by a chassis; a wing boom supported by the chassis, the wing boom including multiple spray nozzle assemblies, each spray nozzle assembly having an outlet for discharging fluid in a spray pattern onto an agricultural field; multiple electromagnetic radiation sources, each source being positioned near an outlet, each source being configured to direct a beam of electromagnetic radiation through a spray pattern discharged from the outlet; multiple electromagnetic detectors, each detector being positioned near an outlet, each detector being configured to detect electromagnetic radiation transmitted through a spray pattern or reflected by a spray pattern discharged from the outlet to produce a detection pattern; a data structure holding multiple calibration patterns providing targets for electromagnetic radiation transmitted through the spray patterns or reflected by the spray patterns; and a controller in communication with the detectors and the data structure, the controller being configured to receive detection patterns and compare the detection patterns to the calibration patterns to determine an error for each spray nozzle assembly.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE. DRAWINGS

Preferred exemplary embodiments of the invention are illustrated in the accompanying drawings in which like reference numerals represent like parts throughout.

DETAILED DESCRIPTION OF THE DRAWINGS

Figure 1:
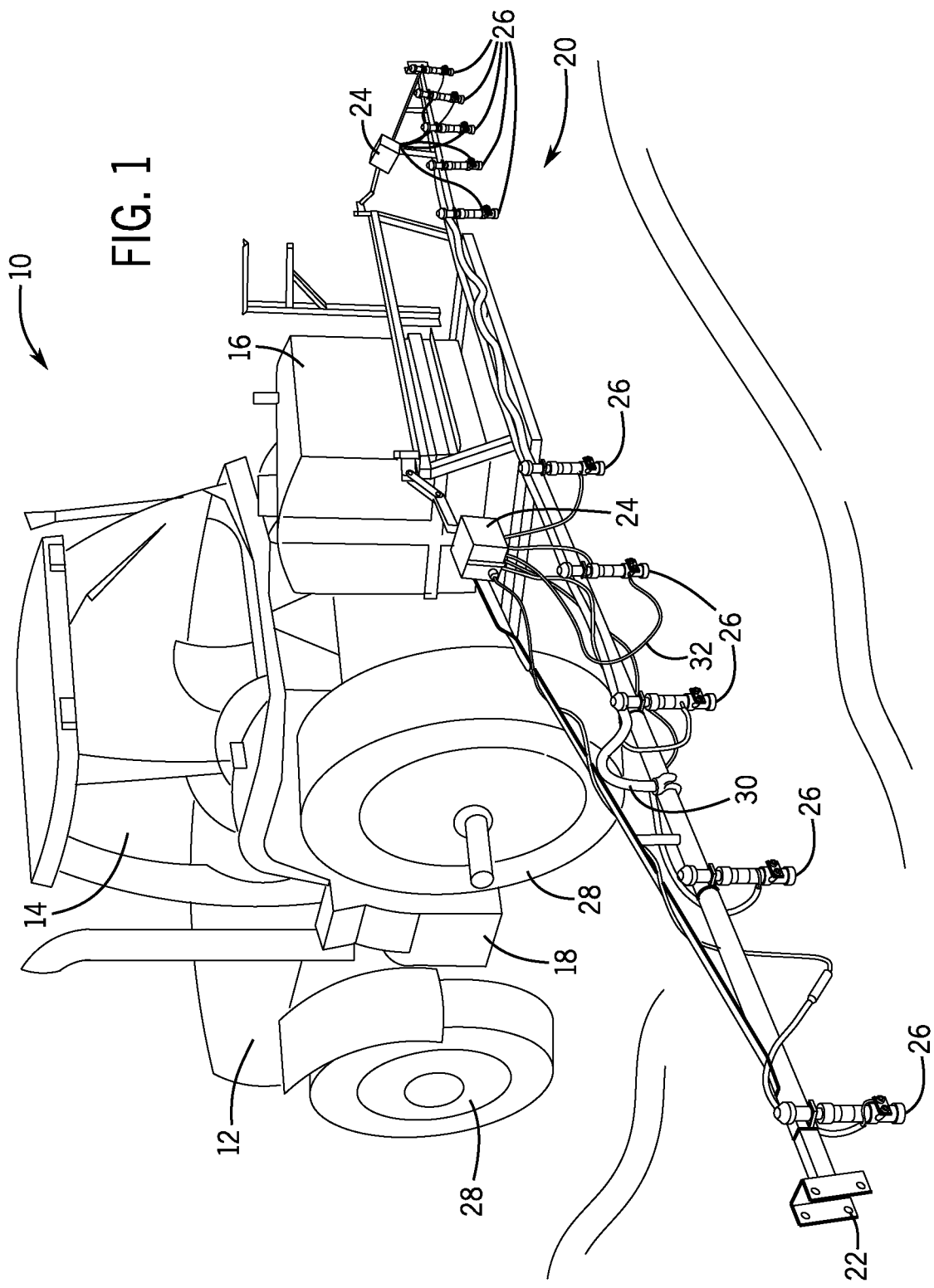
FIG. 1 illustrates a pictorial view of a spraying system in accordance with an aspect of the invention.

Referring generally to the drawings, and more particularly to FIG. 1, an exemplar agricultural product application system, which in the illustrated embodiment is a field spraying system 10 (a tractor with a three point mounted sprayer attached), is shown in accordance with the present invention. The field spraying system 10 can comprise a self-propelled sprayer 12 having an operator cab 14 and a primary fluid tank 16 supported by a chassis 18. A rear end 20 of the chassis 18 may support a wing boom 22 (or multiple wing booms) to which one or more secondary fluid tanks, which could be provided as illustrated by reference numeral 24, may be supported. The wing boom 22 also supports a series of spray nozzle assemblies 26 for spraying an area of a field. The chassis 18 is supported by a set of wheels 28, and the wing boom 22, depending on size, can be additionally supported by a set of smaller wheels (not shown).

Primary distribution lines 30 are flow coupled between the primary fluid tank 16 and the spray nozzle assemblies 26. The primary fluid tank 16 may typically store a carrier fluid such as water. The primary distribution lines 30 may provide flow of the carrier fluid to the spray nozzle assemblies 26 directly or indirectly, such as via one or more charge pumps, accumulators, control valves, pressure relief valves, manifolds and/or supplemental distribution lines in the path as understood in the art for effecting various flow rates, pressures and control for sprayer configurations.

Secondary distribution lines, which could be provided as illustrated by reference numeral 32, may be flow coupled between one or more of the secondary fluid tanks 24 and the spray nozzle assemblies 26. The secondary fluid tanks 24 may typically store a chemical fluid, such as a liquid fertilizer, pesticide, herbicide, or the like. The secondary distribution lines 32 may provide flow of the chemical fluid to the spray nozzle assemblies 26 directly or indirectly, such as via one or more charge pumps, accumulators, control valves, pressure relief valves, headers, manifolds and/or supplemental distribution lines in the path as understood in the art for effecting various flow rates, pressures and control for sprayer configurations. Accordingly, the carrier fluid and the chemical fluid may be stored in different tanks and subsequently mixed at each of the spray nozzle assemblies 26 thereby providing improved distribution in the field. The secondary fluid tanks 24 are typically smaller than the primary fluid tank 16.

Figure 2:
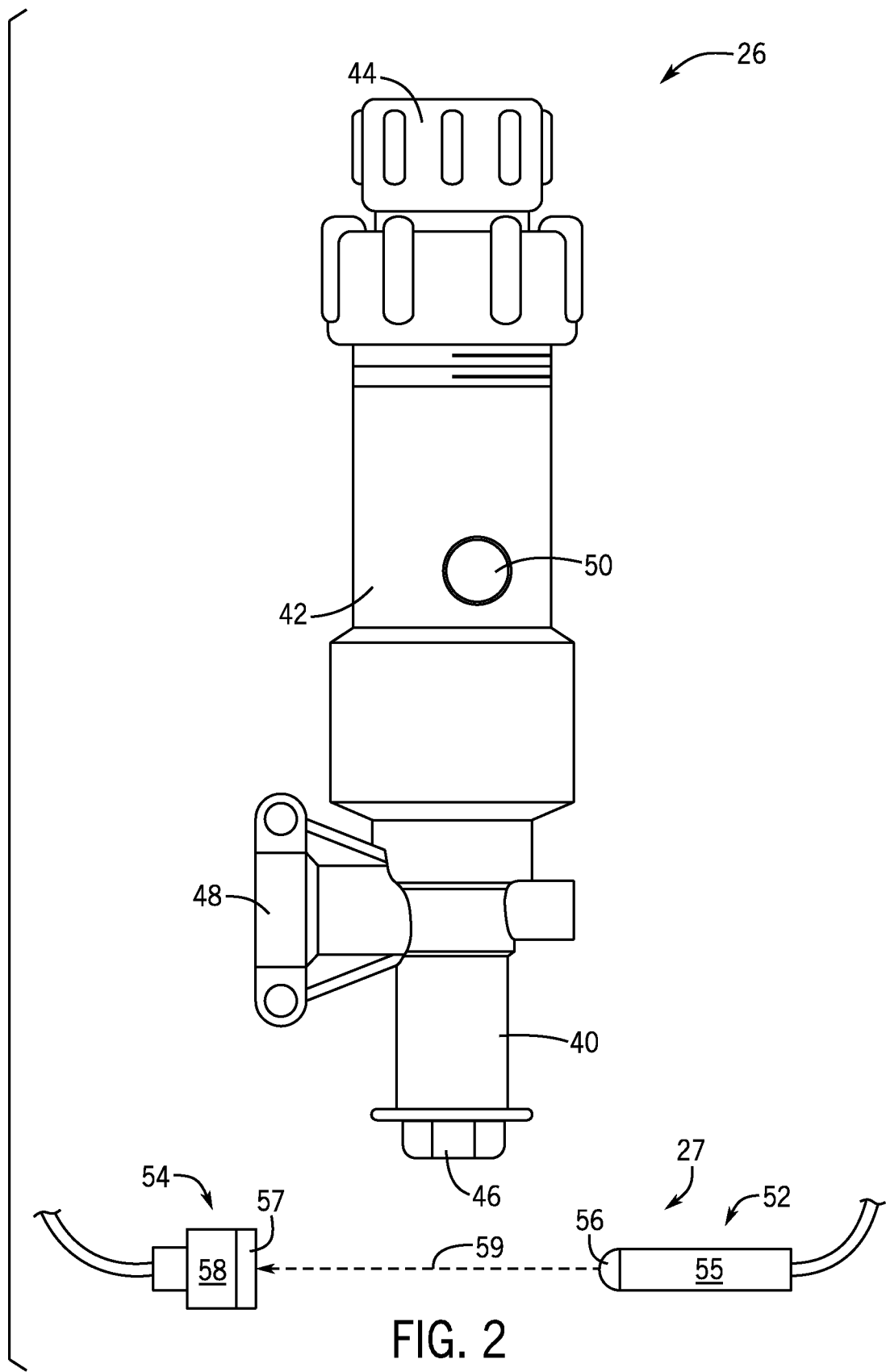
FIG. 2 illustrates a pictorial view of a spray nozzle assembly with a spray pattern detection system in accordance with an aspect of the invention.

Referring now to FIG. 2, a pictorial view of an exemplar spray nozzle assembly 26 with a pattern detection system 27 is provided in accordance with the present invention. In one aspect, the spray nozzle assembly 26 may generally include a nozzle body 40, coupled in turn to a mixing body 42, coupled in turn to a control valve 44. The nozzle body 40 could be thread coupled to the mixing body 42, and the mixing body 42 could be thread coupled to the control valve 44, although other temporary or permanent coupling techniques could be used, such as pressure fittings and/or adhesive agents.

The nozzle body 40 includes a nozzle outlet 46 (exposing an orifice) for spraying a mixed fluid which will typically consist of a carrier fluid (such as water) mixed with a chemical fluid at some concentration. The nozzle body 40 may also include a nozzle body inlet 48 for receiving the carrier fluid. The carrier fluid may come from the primary fluid tank 16 via the primary distribution lines 30.

The mixing body 42 may include a mixing body inlet 50 for receiving the chemical fluid (such as a liquid fertilizer, pesticide, herbicide, or the like). The chemical fluid may come from either of the secondary fluid tanks 24 via the secondary distribution lines 32. Within the mixing body 42, a flow control mechanism may provide a mixing chamber 43 (see FIG. 3) for mixing the carrier fluid with the chemical fluid in the nozzle to provide the mixed fluid.

Figure 3:
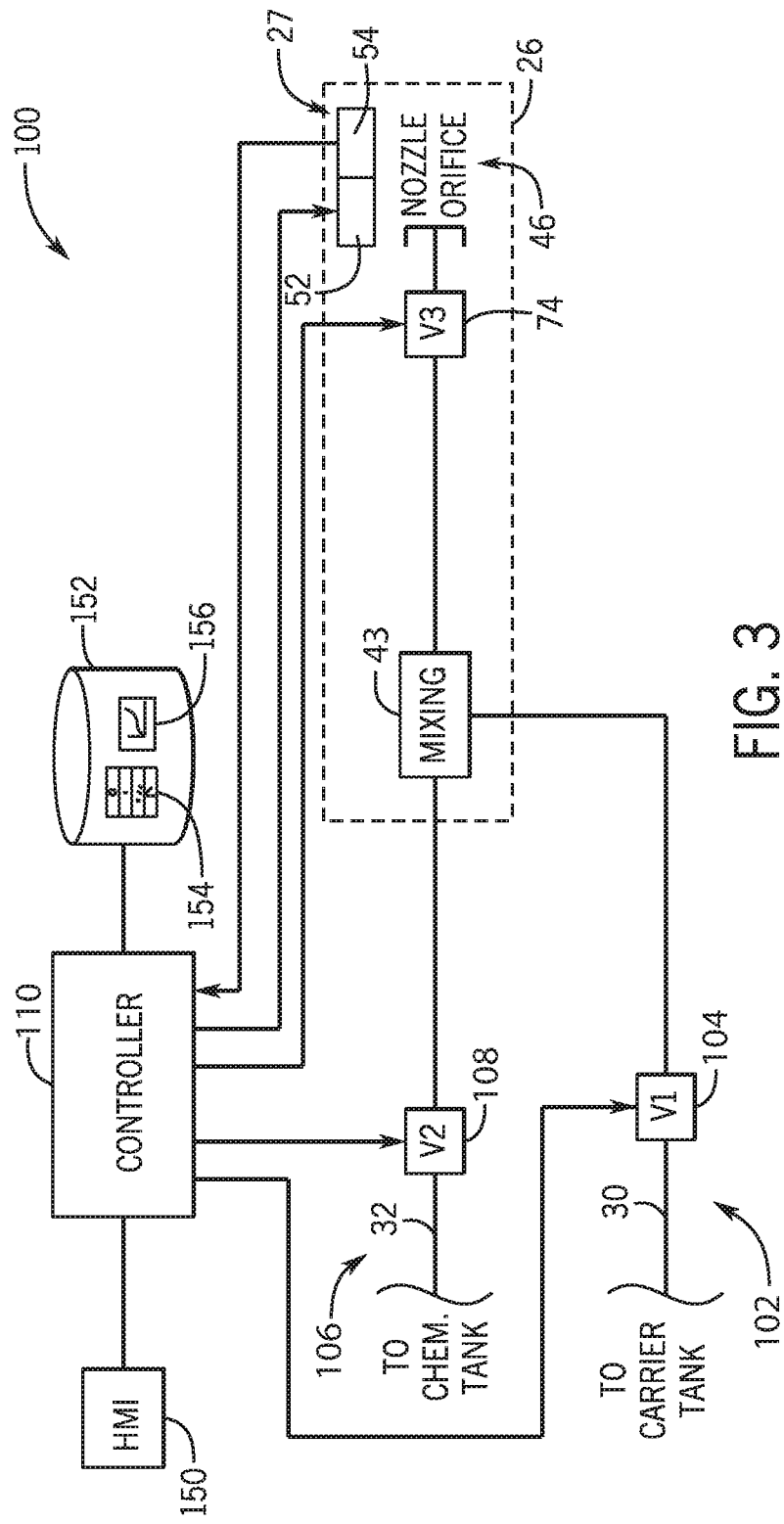
FIG. 3 illustrates a schematic view of a nozzle flow detection system with a spray pattern detection system in accordance with the present invention.

The control valve 44 may operate to stop the mixed fluid from flowing to the nozzle outlet 46, or to allow the mixed fluid to flow to the nozzle outlet 46 for spraying. The control valve 44 could be a passive check valve, as shown in FIG. 2, in which the mixed fluid is mechanically stopped from flowing if there is insufficient pressure applied by the mixed fluid against a valve mechanism, or the mixed fluid is allowed to flow if there is a build-up of sufficient pressure of the mixed fluid against the valve mechanism. Alternatively, the control valve 44 could be an actively controlled solenoid valve, as shown in FIG. 3 by reference numeral 74, in which the mixed fluid is stopped from flowing or allowed to flow depending on a control signal provided to a solenoid which actuates a valve. Accordingly, the control valve 44 may serve to prevent undesirable leaking of the mixed fluid. Also, the control valve 44 may be operator or computer controlled in the field.

Figure 4A:
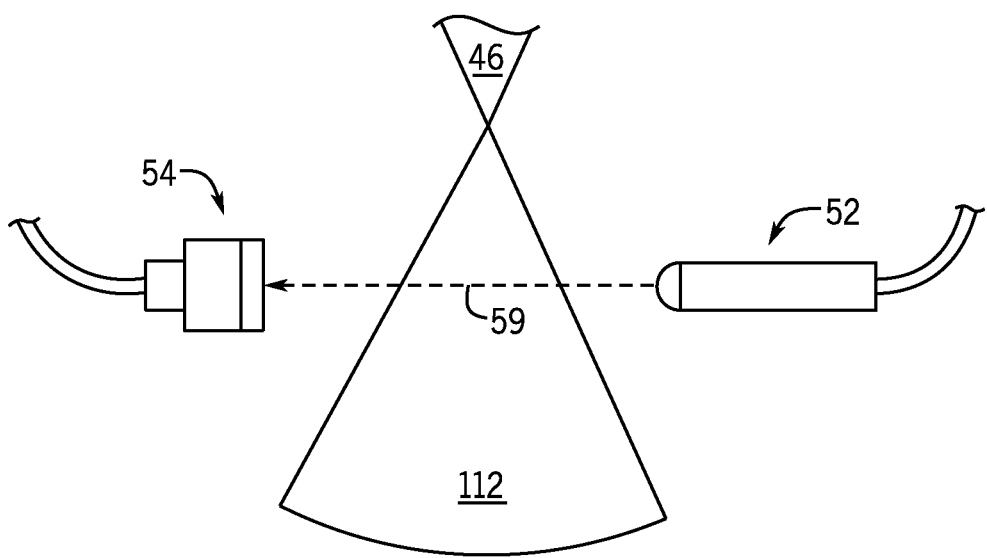
FIG. 4A illustrates a first arrangement of the spray pattern detection system of FIG. 3.
Figure 4B:
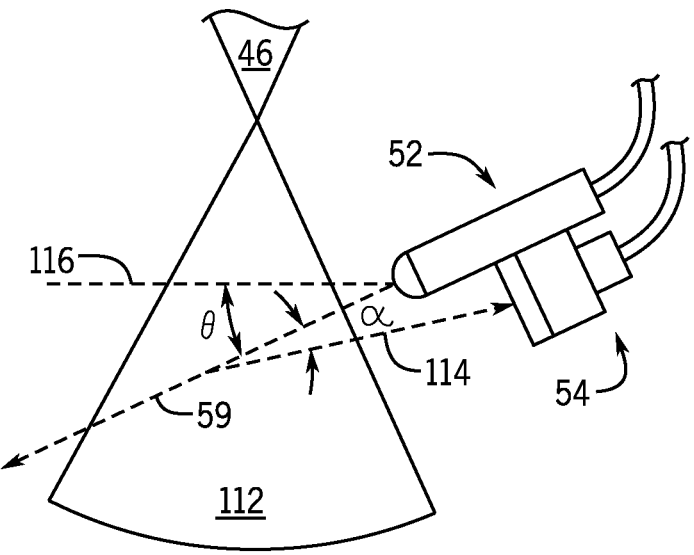
FIG. 4B illustrates a second arrangement of the spray pattern detection system of FIG. 3, each in accordance with an aspect of the invention.

Still referring to FIG. 2, the pattern detection system 27 can include an electromagnetic radiation source 52 and an electromagnetic radiation detector 54. The source 52 and the detector 54 can each be positioned proximal to the nozzle outlet 46. Accordingly, the source 52 can be configured to direct a beam 59 of electromagnetic radiation through a spray pattern discharged by the spray nozzle assembly 26 at the nozzle outlet 46. In addition, the detector 54 can be configured to detect electromagnetic radiation transmitted through the spray pattern, such as when the source 52 and the detector 54 are arranged on opposing sides of a spray pattern as shown in FIGS. 2 and 4A, or in other aspects, detect electromagnetic radiation reflected by the spray pattern, such as when the source 52 and the detector 54 are arranged proximal to one another as shown in FIG. 4B. The detector 54, in turn, can produce a detection pattern or signature from the detected electromagnetic radiation corresponding to a sampling of the spray nozzle assembly 26 at a particular time. In one aspect, the source 52 could include a laser 55, such as a Helium-Neon laser (HeNe) able to operate at a number of different electromagnetic wavelengths, with a collimating lens 56 operable to focus light emitted by the laser through the spray pattern. The detector 54 could include a Fourier lens 57 or other optics operable to direct light from the spray pattern toward a photodiode array 58.

Referring now to FIG. 3, a schematic view of a nozzle wear out detection system, shown as nozzle flow detection system 100, is provided in accordance with the present invention. A first distribution path 102 may be provided for distributing a first fluid, which may be a carrier fluid stored in the primary fluid tank 16. The first distribution path 102 may receive the carrier fluid via the primary distribution line 30, and may include a first electronically controlled valve 104 (identified as "V1"), which may be a solenoid valve operating in a manner similar to the solenoid control valves described above with respect to FIG. 3, for metering the carrier fluid to a mixing chamber of a spray nozzle assembly 26.

A second distribution path 106 may be provided for distributing a second fluid, which may be the chemical fluid stored in the secondary fluid tank 24, The second distribution path 106 may receive the chemical fluid via the secondary distribution line 32. The second distribution path 106 preferably distributes the chemical fluid at a higher pressure than the first distribution path 102 distributing the carrier fluid. The second distribution path 106 may include a metering system which may consist of a second electronically controlled valve 108 (identified as "V2").

A controller 110 may be configured, among other things, to control the first and second electronically controlled valves 104 and 108, respectively. The controller 110 may be a microprocessor, a microcontroller or other programmable logic element as known the art.

The first and second distribution paths 102 and 106, in turn, may be coupled to a spray nozzle assembly 26 (at the mixing chamber 43), such that the chemical fluid and the carrier fluid may be mixed to produce the mixed fluid. The spray nozzle assembly 26 may include a third electronically controlled valve 74 (identified as "V3") for controlling flow of the mixed fluid between the mixing chamber 43 and the nozzle outlet 46, and the controller 110 may be further configured to control the third electronically controlled valve 74.

In an alternative arrangement, the chemical fluid and the carrier fluid may be mixed earlier upstream, including being premixed in combined bulk tank, with a single distribution path provided to the spray nozzle assembly as understood the art (instead of separate chemical and carrier tanks with separate distribution paths). Also, although only a single metering system and spray nozzle assembly 26 is shown in FIG. 3 for ease of understanding, it will be appreciated that the nozzle flow detection system 100 will typically include numerous spray nozzle assemblies 26, and perhaps numerous metering systems, as provided in the field spraying system 10 shown in FIG. 1.

Still referring to FIG. 3, the pattern detection system 27 can be positioned proximal to the nozzle outlet 46 of the spray nozzle assembly 26, such as within a few inches. The pattern detection system 27 could be mounted to the spray nozzle assembly 26 and/or the wing boom 22.

Figure 5A:
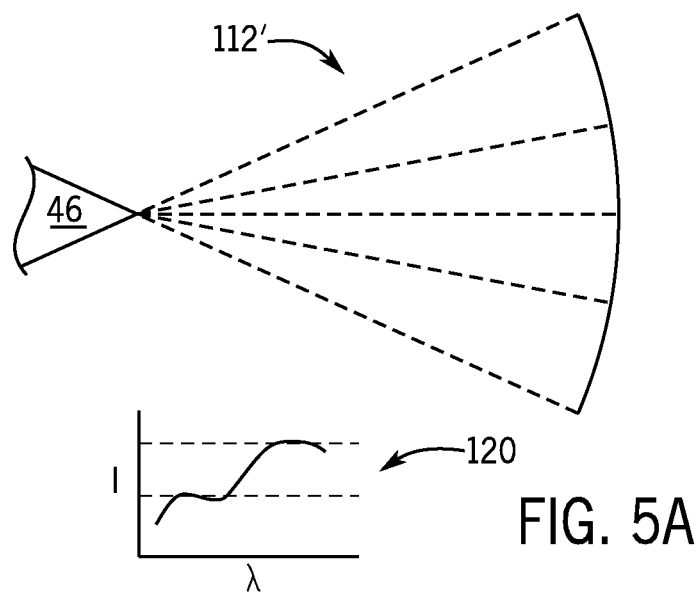
FIG. 5A illustrates a spray nozzle assembly with an outlet producing a spray pattern in a good state.
Figure 5B:
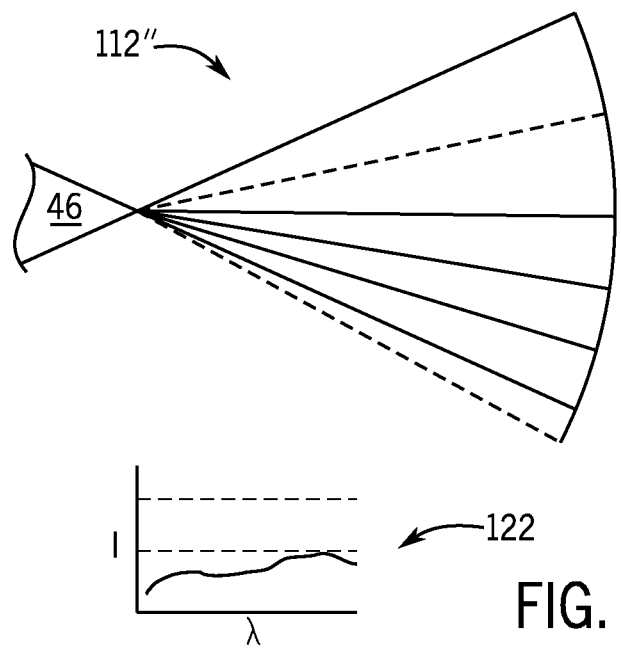
FIG. 5B illustrates a spray nozzle assembly with an outlet producing a spray pattern in a bad state, each in accordance with an aspect of the invention.

With additional reference to FIG. 4A, in one aspect, the detector 54 can be configured to detect electromagnetic radiation transmitted through a spray pattern 112. In such an arrangement, the source 52 and the detector 54 could be arranged on opposing sides of the spray pattern 112 with a beam 59 transmitting directly through the spray pattern 112 from the source 52 to the detector 54. The detector 54 could then detect the beam 59 in a first state 120, with particular intensities at varying wavelengths, corresponding to a known good state, such as when substantially new or initially deployed, as shown in FIG. 5A with consistent dashed lines denoting a desirable spray pattern 112'. Then at a later time, upon the nozzle outlet 46 becoming worn, the detector 54 could detect the beam 59 in a second state 122, with different intensities at varying wavelengths, corresponding to a bad state which sufficiently deviates from the first state 120 (good state) by at least a predetermined threshold, as shown in FIG. 5B with solid lines denoting heavy streams in an undesirable spray pattern 112".

Similarly, with additional reference to FIG. 4B, in another aspect, the detector 54 can be configured to detect a reflection 114 of electromagnetic radiation transmitted through a spray pattern 112. In such an arrangement, the source 52 and the detector 54 could be arranged proximal to one another, on a same side of the spray pattern 112, with a beam 59 transmitting into the spray pattern 112 from the source 52 causing the reflection 114 to return to the detector 54. In one aspect, the source 52 could transmit the beam 59 at first angle $\theta$ with respect to an axis 116 of the nozzle outlet 46 and/or the spray pattern 112 (shown in the horizontal direction by way of example, but could be in the vertical direction as well) so that the reflection 114 could return to the detector 54 at a second angle $\alpha$. Accordingly, the detector 54 could then detect the reflection 114 in a first state 120, with particular intensities at varying wavelengths, corresponding to the known good state as shown in FIG. 5A, then at a later time, in the second state 122, corresponding to the bad state as shown in FIG. 5B.

Still referring to FIG. 3, the controller 110 can also be in communication with a Human Machine Interface (HMI) 150 and a data structure 152. The HMI 150 may consist of a graphical display, such as a touchscreen monitor, warning lights, keyboard and/or other I/O positioned in the operator cab 14. The data structure 152 may include a table, database and/or other objects stored in a non-transient computer readable medium, such as a mass storage device or memory. The data structure 152 may hold a first data set 154 consisting of calibration patterns for the multiple spray nozzle assemblies 26, each corresponding to discharge of fluid at respective nozzle outlet 46. In one aspect, the first data set 154 may consist of a single predetermined calibration pattern for a substantially new nozzle outlet which may be implemented in the system for comparison to each of the spray nozzle assemblies 26. In another aspect, the first data set 154 may consist of multiple unique calibration patterns customized for particular spray nozzle assemblies 26 which may be obtained by sampling the spray nozzle assemblies 26 when substantially new (or initially deployed). The data structure 152 may also hold a second data set 156 consisting of detection patterns for the spray nozzle assemblies 26 each time the controller 110 executes to sample the spray nozzle assemblies 26.

Figure 6:
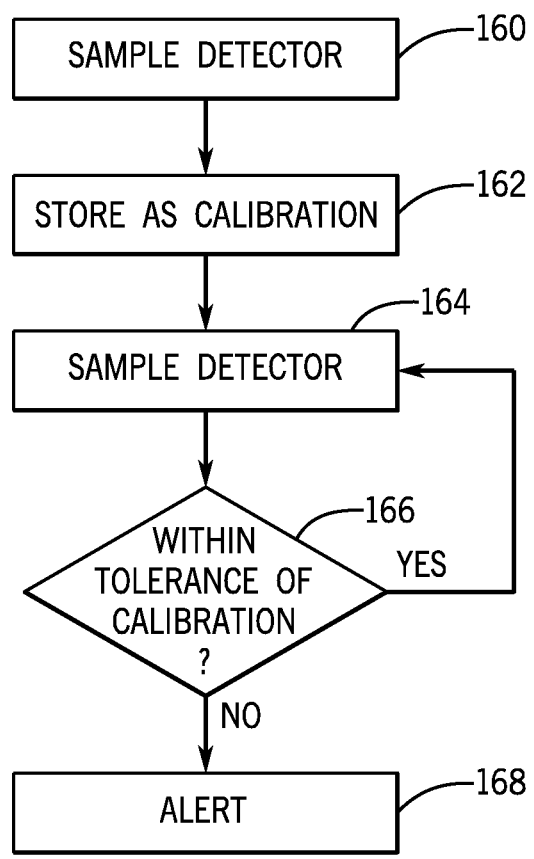
FIG. 6 illustrates a flow chart of the nozzle flow detection system of FIG. 3 in accordance with an aspect of the invention.

Referring also to FIG. 6, in one aspect of operation, the controller 110 may receive one or more calibration patterns, such as via an initial sampling by the pattern detection system 27 with each of the spray nozzle assemblies 26 of the field spraying system 10 fully on, and/or retrieval of one or more predetermined models or libraries (step 160). The controller 110 may store such calibration patterns in the first data set 154 of the data structure 152 (step 162). Next, the controller 110 may receive detection patterns, via pattern detection systems 27, with each of the spray nozzle assemblies 26 of the field spraying system 10 turned on (step 164). These flow measurements may occur, for example, while spraying in the field.

In decision step 166, the controller 110 can compare each of the detection patterns to each of the respective calibration patterns to determine an error for each of the spray nozzle assemblies 26, such as the first state 120 (good state) exceeding the second state 122 (bad state) by at least a predetermined threshold, if errors for the spray nozzle assemblies 26 are within the predetermined threshold, such as within ±10%, the process may periodically return to step 164 and repeat. However, if the error for any of the spray nozzle assemblies 26 exceeds the predetermined threshold, the controller 110 may generate an alert (step 168). The alert may be visually displayed to an operator of the field spraying system 10, such as via the HMI 150, and the alert may indicate which spray nozzle assembly 26 exceeded the tolerance.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

What is claimed is:

1. A spray system comprising:
   a boom supporting a spray nozzle assembly having an outlet for discharging fluid in a spray pattern onto an agricultural field;
   an electromagnetic radiation source positioned proximal to the outlet, the source being configured to direct a beam of electromagnetic radiation through the spray pattern;
   an electromagnetic radiation detector positioned proximal to the outlet, the detector being configured to detect electromagnetic radiation transmitted through the spray pattern or reflected by the spray pattern to produce a detection pattern;
   a data structure holding a calibration pattern providing a target for electromagnetic radiation transmitted through the spray pattern or reflected by the spray pattern; and
   a controller in communication with the detector and the data structure, the controller being configured to receive the detection pattern and compare the detection pattern to the calibration pattern to determine an error for the spray nozzle assembly.

2. The spray system of claim 1, wherein the source and the detector are arranged on opposing sides of the spray pattern, and wherein the detector detects electromagnetic radiation transmitted through the spray pattern to produce the detection pattern.

3. The spray system of claim 1, wherein the source and the detector are arranged proximal to one another, and wherein the detector detects electromagnetic radiation reflected by the spray pattern to produce the detection pattern.

4. The spray system of claim 1, wherein the source comprises a laser with a collimating lens, and wherein the detector comprises a photodiode array with a Fourier lens.

5. The spray system of claim 1, wherein the controller is further configured to generate an alert when the error is greater than a predetermined tolerance.

6. The spray system of claim 5, further comprising a Human Machine Interface (HMI), wherein the alert is displayed to the HMI to indicate a worn spray nozzle assembly.

7. The spray system of claim 1, wherein the calibration pattern corresponds to the spray nozzle assembly discharging fluid in a spray pattern at an earlier time.

8. The spray system of claim 1, wherein the controller is further configured to periodically generate a detection pattern for comparing to the calibration pattern.

9. The spray system of claim 1, wherein the spray nozzle assembly is one of a plurality of spray nozzle assemblies, and the data structure holds a plurality of calibration patterns, each calibration pattern corresponding to a spray nozzle assembly.

10. A method for determining a worn spray nozzle assembly comprising:
    discharging fluid in a spray pattern onto an agricultural field from an outlet of a spray nozzle assembly supported by a boom;
    directing a beam of electromagnetic radiation from an electromagnetic radiation source positioned proximal to the outlet through the spray pattern;
    detecting electromagnetic radiation transmitted through the spray pattern or reflected by the spray pattern at an electromagnetic radiation detector positioned proximal to the outlet to produce a detection pattern; and
    comparing the detection pattern to a calibration pattern providing a target for electromagnetic radiation transmitted through the spray pattern or reflected by the spray pattern to determine an error for the spray nozzle assembly.

11. The method of claim 10, further comprising arranging the source and the detector on opposing sides of the spray pattern, and detecting electromagnetic radiation transmitted through the spray pattern to produce the detection pattern.

12. The method of claim 10, further comprising arranging the source and the detector proximal to one another, and detecting electromagnetic radiation reflected by the spray pattern to produce the detection pattern.

13. The method of claim 10, further comprising generating an alert when the error is greater than a predetermined tolerance.

14. The method of claim 10, wherein the calibration pattern corresponds to the spray nozzle assembly discharging fluid in a spray pattern at an earlier time.

15. The method of claim 10, further comprising periodically generating a detection pattern for comparing to the calibration pattern.

16. A self-propelled sprayer comprising:
    an operator cab supported by a chassis;
    a wing boom supported by the chassis, the wing boom including a plurality of spray nozzle assemblies, each spray nozzle assembly having an outlet for discharging fluid in a spray pattern onto an agricultural field;
    a plurality of electromagnetic radiation sources, each source being positioned proximal to a corresponding one of the outlets and being configured to direct a beam of electromagnetic radiation through the spray pattern discharged from the outlet;
    a plurality of electromagnetic detectors; each detector being positioned proximal to a corresponding one of the outlets and being configured to detect electromagnetic radiation transmitted through the spray pattern or reflected by the spray pattern discharged from the outlet to produce a detection pattern;
    a data structure holding a plurality of calibration patterns providing targets for electromagnetic radiation transmitted through the spray patterns or reflected by the spray patterns; and a controller in communication with the plurality of detectors and the data structure, the controller being configured to receive the detection patterns and compare the detection patterns to the calibration patterns to determine an error for each spray nozzle assembly.

17. The sprayer of claim 16, wherein the plurality of electromagnetic radiation sources and the plurality of electromagnetic detectors are arranged on opposing sides of the spray patterns, and wherein each detector detects electromagnetic radiation transmitted through the spray pattern to produce the detection pattern.

18. The sprayer of claim 16, wherein the plurality of electromagnetic radiation sources and the plurality of electromagnetic detectors are arranged proximal to one another and wherein each detector detects electromagnetic radiation reflected by the spray pattern to produce the detection pattern.

19. The sprayer of claim 16, further comprising a Human Machine Interface (HMI), wherein the controller is further configured to generate an alert displayed to the HMI to indicate a worn spray nozzle assembly when the error is greater than a predetermined tolerance.

20. The sprayer of claim 16, wherein the controller is further configured to periodically generate detection patterns for comparing to the calibration patterns.

* * * * *